US010198628B2

(12) United States Patent
Loginov et al.

(10) Patent No.: US 10,198,628 B2
(45) Date of Patent: Feb. 5, 2019

(54) METHOD AND APPARATUS FOR DETERMINING A DOCUMENT SUITABILITY FOR SERVER-BASED OPTICAL CHARACTER RECOGNITION (OCR) PROCESSING

(71) Applicant: ABBYY Development LLC, Moscow (RU)

(72) Inventors: Vasily Loginov, Moscow Region (RU); Ivan Zagaynov, Moscow Region (RU)

(73) Assignee: ABBYY DEVELOPMENT LLC, Moscow (RU)

( * ) Notice: Subject to any disclaimer, the term of this patent is extended or adjusted under 35 U.S.C. 154(b) by 11 days.

(21) Appl. No.: 15/377,170

(22) Filed: Dec. 13, 2016

(65) Prior Publication Data

US 2018/0157906 A1 Jun. 7, 2018

(30) Foreign Application Priority Data

Dec. 6, 2016 (RU) .................. 2016147695

(51) Int. Cl.
*G06K 9/00* (2006.01)
(52) U.S. Cl.
CPC ..... *G06K 9/00442* (2013.01); *G06K 2209/01* (2013.01)
(58) Field of Classification Search
CPC . G06K 9/036; G06K 9/00442; G06K 2209/01
(Continued)

(56) References Cited

U.S. PATENT DOCUMENTS 7,639,875 B2 12/2009 Molnar et al.
8,098,943 B2 1/2012 Raveendran et al.
(Continued)

FOREIGN PATENT DOCUMENTS

EP 3032376 A1 6/2016
JP 2016110578 A 6/2016

OTHER PUBLICATIONS

Kia, O., "Document Image Compression and Analysis", Language and Media Processing Laboratory, Institutes for Advanced Computer Studies, Doctoral Dissertation, University of Maryland at College Park, College Park, MD, USA, Apr. 1997, 142 pages.

*Primary Examiner* — Daniel G Mariam
(74) *Attorney, Agent, or Firm* — Lowenstein Sandler LLP

(57) ABSTRACT

There is disclosed a method of analyzing a digital image of a document (to determine, as example, a document suitability for server-based OCR processing) in a computer system that includes a user electronic device (for acquiring or storing a digital image of a document) connectable to a server (for executing the server-based OCR processing of the digital image to create a recognized-text document). The method is executable by the user electronic device and comprises: acquiring the digital image of the document; analyzing an OCR quality parameter associated with a compressed digital image to be created from the digital image using a compression algorithm and a compression parameter; in response to the OCR quality parameter being above or equal to a pre-determined threshold: transmitting the compressed digital image to the server. Optionally, the method further comprises compressing the digital image using the compression algorithm and the compression parameter to create the compressed digital image before transmission thereof.

29 Claims, 8 Drawing Sheets

(58) Field of Classification Search
USPC .............................. 382/112, 203, 232, 313
See application file for complete search history.

(56) References Cited

U.S. PATENT DOCUMENTS

| | | | | |
|---|---|---|---|---|
| 8,873,890 | B2* | 10/2014 | Kurzweil | G06K 9/228 |
| | | | | 348/561 |
| 9,305,227 | B1* | 4/2016 | Nambiar | G06K 9/18 |
| 9,317,764 | B2* | 4/2016 | Baheti | G06K 9/2054 |
| 9,672,510 | B2* | 6/2017 | Roach | G06Q 20/3223 |
| 2007/0292036 | A1* | 12/2007 | Nakayama | H04N 1/642 |
| | | | | 382/232 |
| 2015/0036003 | A1 | 2/2015 | Sakurai et al. | |
| 2016/0171310 | A1 | 6/2016 | Kasahara et al. | |

* cited by examiner

METHOD AND APPARATUS FOR DETERMINING A DOCUMENT SUITABILITY FOR SERVER-BASED OPTICAL CHARACTER RECOGNITION (OCR) PROCESSING

CROSS REFERENCE TO RELATED APPLICATIONS

The present application claims the benefit of priority under 35 USC 119 to Russian Patent Application No. 2016147695, filed Dec. 6, 2016; the disclosure of which is incorporated herein by reference in its entirety for all purposes.

FIELD

The present technology relates to computer-implemented methods and systems for document processing in general and specifically to a method and an apparatus for determining a document suitability for server-based OCR processing.

BACKGROUND

Printed natural-language documents continue to represent a widely used communications medium among individuals, within organizations, and for distribution of information among information consumers. With the advent of ubiquitous and powerful computational resources, including personal computational resources embodied in smart phones, pads, tablets, laptops, and personal computers, as well as larger-scale computational resources embodied in cloud-computing facilities, data centers, and higher-end servers within various types of organizations and commercial entities, natural-language information is, with increasing frequency, encoded and exchanged in electronic documents.

Printed documents are essentially images, while electronic documents contain sequences of numerical encodings of natural-language symbols and characters. Because electronic documents provide advantages in cost, transmission and distribution efficiencies, ease of editing and modification, and robust-storage over printed documents, an entire industry supporting methods and systems for transforming printed documents into electronic documents has developed over the past 50 years.

Computational optical-character-recognition methods and systems and electronic scanners together provide reliable and cost-effective imaging of printed documents and computational processing of the resulting digital images of text-containing documents to generate electronic documents corresponding to the printed documents.

With the advent of camera-containing smart phones and other mobile, processor-controlled imaging devices, digital images of text-containing documents can be generated by a large variety of different types of ubiquitous, hand-held devices, including smart phones, inexpensive digital cameras, inexpensive video surveillance cameras, and imaging devices included in mobile computational appliances, including tablets and laptops. Furthermore, some of these devices have memories that store a plethora of images (including text images and the like) that a user may be desirous of having Optical Character Recognition (OCR) processed.

Digital images of text-containing documents produced (or stored) by these hand-held devices and appliances can then be processed, by computational optical-character-recognition systems, including optical-character-recognition applications in smart phones, to produce corresponding electronic documents. Typically, the digital image captured by the user electronic device is transmitted, via a communication network, to a server of the optical-character-recognition systems for performing the server-based (OCR) function (as opposed to a locally-executed OCR function, which tends to result in a lower quality of the output of the OCR).

In order to ensure an acceptable speed of transmission of the digital image to the server, as well as to save on used bandwidth associated with the transmission via the communication network, it is known to compress the digital image into a compressed digital image to transmit to the server. The compression is done using a codec that uses a compression algorithm, such as Joint Photographic Experts Group (JPEG) or JPEG 2000. A typical compression algorithm is associated with a compression parameter, such as a compression coefficient.

The server then (i) receives the compressed digital image, (ii) de-compresses the compressed digital image to obtain a de-compressed digital image, and (iii) executes the server-based OCR function to generate a recognized text document based on the de-compressed digital image, the recognized text document based containing text generated on the basis of the de-compressed digital image. The server can then transmit back the recognized text document to the user electronic device via the communication network (in an original or a compressed state thereof).

One of the reasons for implementing optical-character-recognition system with the server-based OCR function (as opposed to the locally-executed OCR function) is the quality of the digital image produced by such hand-held document imaging (for example, the digital images produced by hand held devices tend to be associated with increased noise, optical blur, and other defects and deficiencies in the text-containing digital images produced by the hand-held devices and appliances in comparison with dedicated document-scanning appliances, for example).

The server-based OCR function involves pre-processing of the de-compressed digital image in order to reduce the number of artefacts in the de-compressed digital image (i.e. reducing noise, reducing optical blur, etc.). The server also, as part of the server-based OCR function, executes a high quality binarization and computational-intensive OCR routines. Some or all of these may be impractical to implement locally on the user electronic device (for example, the computational power required for such processes may not be available on the user electronic devices).

SUMMARY

It is an object of the present technology to ameliorate at least some of the inconveniences present in the prior art.

Embodiments of the present technology have been developed based on the inventors' appreciation that there exists at least one technical problem within the prior art approaches to transmitting compressed digital images between the user electronic device and the server executing the server-based OCR function.

Without wishing to be bound by any specific theory, the inventors have appreciated that with the increased coefficient of compressing of the digital image to obtain the compressed digital image of a smaller size (compared to the digital image), the quality of the compressed digital image (and, more specifically, the quality of the de-compressed digital image generated from the compressed digital image) can potentially deteriorate. This, in turn, potentially results in a decreased quality of the output of the server-based OCR processing of the de-compressed digital image (for example, manifesting in a higher number of errors in the recognized text). At the same time, inventors have appreciated that it may be desirable to use as high of a compression coefficient as possible (to save on transmission time and the bandwidth used), while still ensuring the optimal quality of the compressed digital image (to ensure that the server-based OCR function can render an output of an acceptable quality).

Inventors have further appreciated that while it is possible to send the compressed digital image to the server to execute the server-based OCR function and then determine if the output is of the acceptable quality or not (and in case of the unacceptable quality of the output to require the user to re-generate the digital image of the document), such an approach would result in an unacceptable time required to generate the acceptable level of the output of the server-based OCR function.

Inventors have addressed the above-identified shortcoming of the prior art approaches by developing a method of determining, at the user electronic device and prior to transmitting the compressed digital image to the server, an OCR quality parameter associated with the digital image (or, more specifically, with a de-compressed digital image to be created from a compressed digital image that in turn is to be created from the digital image). Broadly speaking, the OCR quality parameter is indicative of whether the de-compressed digital image having been (or to be) created from the compressed digital image that in turn has been (or to be) created from the digital image using a compression algorithm with a compression parameter (such as a compression coefficient, etc.) is suitable to render an acceptable outcome by the server-based OCR processing.

Embodiments of the present technology contemplate, in response to the OCR quality parameter being above or equal to a pre-determined threshold executing: compressing the digital image using the compression algorithm and the compression parameter to create the compressed digital image; and transmitting the compressed digital image to the server for the server to execute the server-based OCR processing.

On the other hand, in response, to the OCR quality parameter being below the pre-determined threshold, the embodiments of the present technology contemplate causing the user electronic device to re-capture the digital image of the printed document (for example, by providing an appropriate message to a user of the user electronic device).

Alternatively, the embodiments of the present technology contemplate iteratively determining such value for a compression parameter (such as the compression coefficient) that would result in the OCR quality parameter being above or equal to the pre-determined threshold (thus, ensuring that the compression parameter that is predicted will likely result in an acceptable output of the server-based OCR function).

In other words, embodiments of the present technology aim to find the compression parameter (such as the compression coefficient) that finds a balance between: (i) ensuring acceptable speed of transmission via the communication network and/or bandwidth used and (ii) ensuring a certain level of the quality of the output of the OCR function performed on the de-compressed digital image that is generated based on the compressed digital image using the compression parameter.

In accordance with a first broad aspect of the present technology there is provided a method of analyzing a digital image of a document. The method executable in a computer system, the computer system including: a user electronic device; a server, accessible by the user electronic device via a communication network, the server configured for executing a server-based OCR processing of the digital image to create a recognized-text document. The method executable by the user electronic device, the method comprises: acquiring, by the user electronic device, the digital image of the document; analyzing, by a classifier executed by the user electronic device, an OCR quality parameter associated with a compressed digital image, the compressed digital image to be created from the digital image using a compression algorithm and a compression parameter; in response to the OCR quality parameter being above or equal to a pre-determined threshold: transmitting the compressed digital image to the server for the server to execute the server-based OCR processing.

In some implementations of the method, prior to the transmitting, the method further comprises compressing the digital image using the compression algorithm and the compression parameter to create the compressed digital image.

In some implementations of the method, in response to the OCR quality parameter being below the pre-determined threshold not executing: compressing the digital image using the compression algorithm and the compression parameter to create the compressed digital image; transmitting the compressed digital image to the server for the server to execute the server-based OCR processing.

In some implementations of the method, the method further comprises, in response to the OCR quality parameter being below the pre-determined threshold, causing user electronic device to acquire another digital image of the document.

In some implementations of the method, the analyzing the OCR quality parameter comprises: compressing the digital image using the compression algorithm to create a test compressed digital image, the compression algorithm using the compression parameter; de-compressing the test compressed digital image to create a decompressed test digital image; applying the classifier to the decompressed test digital image to determine the OCR quality parameter, the OCR quality parameter being indicative of whether the decompressed test digital image having been compressed using the compression parameter is suitable to render an acceptable outcome by the server-based OCR processing.

In some implementations of the method, the analyzing the OCR quality parameter comprises: executing a first compressing the digital image using the compression algorithm to create a first test compressed digital image, the compression algorithm using a first compression parameter; de-compressing the first test compressed digital image to create a first test decompressed digital image; executing a second compressing the digital image using the compression algorithm to create a second test compressed digital image, the compression algorithm using a second compression parameter; de-compressing the second compressed digital image to create a second test decompressed digital image; applying the classifier to the first decompressed test digital image to determine a first OCR quality parameter and to the second decompressed digital image to determine a second OCR quality parameter; selecting one of the first compression parameter and the second compression parameter based on an associated one of the first OCR quality parameter and the second OCR quality parameter being indicative of a higher suitability of the respective one of the first decompressed test digital image and the second decompressed test digital image for rendering an acceptable outcome by the server-based OCR processing; and wherein the compressing the digital image using the compression algorithm to render the compressed digital image is executed by using the selected one of the first compression parameter and the second compression parameter.

In some implementations of the method, the analyzing the OCR quality parameter associated with the compressed digital image comprises: executing the classifier, the classifier having been trained to predict the OCR quality parameter associated with the compressed digital image based on primary characteristics associated with the digital image without having to compress the digital image.

In some implementations of the method, the primary characteristics include at least one of: a font size, number of characters, number of characters per page, brightness of the image, contrast level of the image.

In some implementations of the method, the compression algorithm is implemented as a codec selected from at least one of: JPEG and JPEG 2000.

In some implementations of the method, the analyzing the OCR quality parameter associated with a compressed digital image is further based on compression data obtained from the codec.

In some implementations of the method, the classifier is implemented as a machine learning algorithm.

In some implementations of the method, the method further comprises training the machine learning algorithm.

In some implementations of the method, the analyzing the OCR quality parameter comprises: defining four contour images; splitting each of the four contour images into non-overlapping blocks; determining, for each of the four contour images, an average contrast; generating binary version of the image in order to define contour pixels; determining sharp pixels of each of the blocks; determining the number of contour pixels for each of the blocks; determining text blocks; determining the OCR quality parameter based on the text blocks.

In some implementations of the method, the method further comprises selecting those text blocks with the smallest font and wherein the determining the OCR quality parameter is executed on the selected text blocks with the smallest font.

In accordance with another broad aspect of the present technology, there is provided a system for analyzing a digital image of a document. The system comprises a user electronic device comprising a processor, the processor configured for: accessing a server, via a communication network, the server configured for executing the server-based OCR processing of the digital image to create a recognized-text document; the processor being further configured to: acquire, the digital image of the document; analyze, using a classifier executed by the processor, an OCR quality parameter associated with a compressed digital image, the compressed digital image to be created from the digital image using a compression algorithm and a compression parameter; in response to the OCR quality parameter being above or equal to a pre-determined threshold: transmit the compressed digital image to the server for the server to execute the server-based OCR processing.

In some implementations of the system, the processor is further configured to compress the digital image using the compression algorithm and the compression parameter to create the compressed digital image.

In some implementations of the system, the processor being further configured, in response to the OCR quality parameter being below the pre-determined threshold not to execute: compressing the digital image using the compression algorithm and the compression parameter to create the compressed digital image; transmitting the compressed digital image to the server for the server to execute the server-based OCR processing.

In some implementations of the system, the processor is further configured, in response to the OCR quality parameter being below the pre-determined threshold, to cause user electronic device to acquire another digital image of the document.

In some implementations of the system, to analyze the OCR quality parameter, the processor is configured to: compress the digital image using the compression algorithm to create a test compressed digital image, the compression algorithm using the compression parameter; de-compress the test compressed digital image to create a decompressed test digital image; apply the classifier to the decompressed test digital image to determine the OCR quality parameter, the OCR quality parameter being indicative of whether the decompressed test digital image having been compressed using the compression parameter is suitable to render an acceptable outcome by the server-based OCR processing.

In some implementations of the system, to analyze the OCR quality parameter, the processor is configured to: execute a first compressing the digital image using the compression algorithm to create a first test compressed digital image, the compression algorithm using a first compression parameter; de-compress the first test compressed digital image to create a first test decompressed digital image; execute a second compressing the digital image using the compression algorithm to create a second test compressed digital image, the compression algorithm using a second compression parameter; de-compress the second compressed digital image to create a second test decompressed digital image; apply the classifier to the first decompressed test digital image to determine a first OCR quality parameter and to the second decompressed digital image to determine a second OCR quality parameter; select one of the first compression parameter and the second compression parameter based on an associated one of the first OCR quality parameter and the second OCR quality parameter being indicative of a higher suitability of the respective one of the first decompressed test digital image and the second decompressed test digital image for rendering an acceptable outcome by the server-based OCR processing; and wherein the compressing the digital image using the compression algorithm to create the compressed digital image is executed by using the selected one of the first compression parameter and the second compression parameter.

In some implementations of the system, to analyze the OCR quality parameter associated with the compressed digital image, the processor is configured to: execute the classifier, the classifier having been trained to predict the OCR quality parameter associated with the compressed digital image based on primary characteristics associated with the digital image without having to compress the digital image.

In some implementations of the system, the primary characteristics include at least one of: a font size, number of characters, number of characters per page, brightness of the image, contrast level of the image.

In some implementations of the system, the compression algorithm is implemented as a codec selected from at least one of: JPEG and JPEG 2000.

In some implementations of the system, to analyze the OCR quality parameter associated with a compressed digital image, the processor is configured to consider compression data obtained from the codec.

In some implementations of the system, the classifier is implemented as a machine learning algorithm.

In some implementations of the system, the processor is further configured to execute training the machine learning algorithm.

In some implementations of the system, to analyze the OCR quality parameter, the processor is configured to: define four contour images; split each of the four contour images into non-overlapping blocks; determine, for each of the fourth contour images, an average contrast; generate binary version of the image in order to define contour pixels; determine sharp pixels of each of the blocks; determine the number of contour pixels for each of the blocks; determine text blocks; determine the OCR quality parameter based on the text blocks.

In some implementations of the system, the processor being further configured to select those text blocks with the smallest font and wherein the determining the OCR quality parameter is executed on the selected text blocks with the smallest font.

In accordance with yet another broad aspect of the present technology, there is provided a method of analyzing a digital image of a document, the method executable by a user electronic device, the user electronic device configured to connect, via a communication network, to a server, the server configured for executing a server-based OCR processing of the digital image to create a recognized-text document. The method comprises: acquiring, by the user electronic device, the digital image of the document; analyzing, by a classifier executed by the user electronic device, an OCR quality parameter associated with a compressed digital image, the compressed digital image to be created from the digital image using a compression algorithm and a compression parameter; in response to the OCR quality parameter being above or equal to a pre-determined threshold: transmitting the compressed digital image to the server for the server to execute the server-based OCR processing.

In the context of the present specification, a "server" is a computer program that is running on appropriate hardware and is capable of receiving requests (e.g., from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" (or a "user electronic device") is any computer hardware that is capable of running software appropriate to the relevant task at hand. Thus, some (non-limiting) examples of electronic devices include personal computers (desktops, laptops, netbooks, etc.), smartphones, and tablets, and the like. It should be noted that a device acting as an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "computer readable information storage medium" (or a "data storage device") is intended to include media of any nature and kind whatsoever, including RAM, ROM, disks (CD-ROMs, DVDs, floppy disks, hard drivers, etc.), USB keys, solid state-drives, tape drives, etc.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
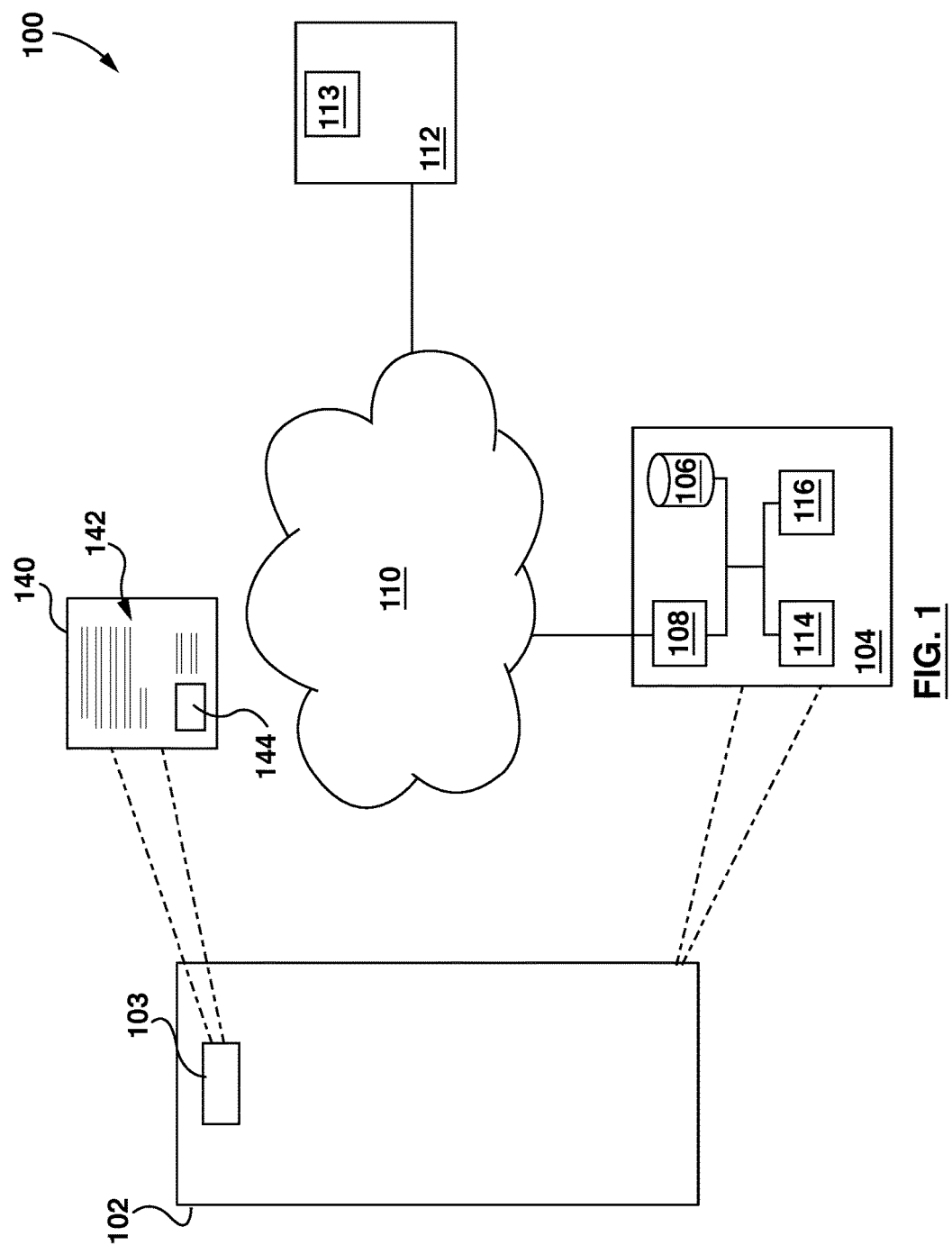
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises a user electronic device 102. The implementation of the user electronic device 102 is not particularly limited, but as an example, the user electronic device 102 may be implemented as a personal computer (desktops, laptops, netbooks, etc.), a wireless communication device (such as a smartphone, a cell phone, a tablet and the like). In the embodiment depicted in FIG. 1, the user electronic device 102 is implemented as a smart phone.

The user electronic device 102 is associated with an image-capturing interface 103. Broadly speaking, the image-capturing interface 103 comprises hardware (and associated software, if need be) for capturing a digital image. The digital image can be, for example, a digital image of a printed document 140 containing a text 142 (and potentially non-text items, such as an image 144). Naturally, the printed document 140 can contain one or more pages, some or all of the one or more pages having different text 142, different images 144, different layouts, different fonts, font sizes, etc.

Figure 8:
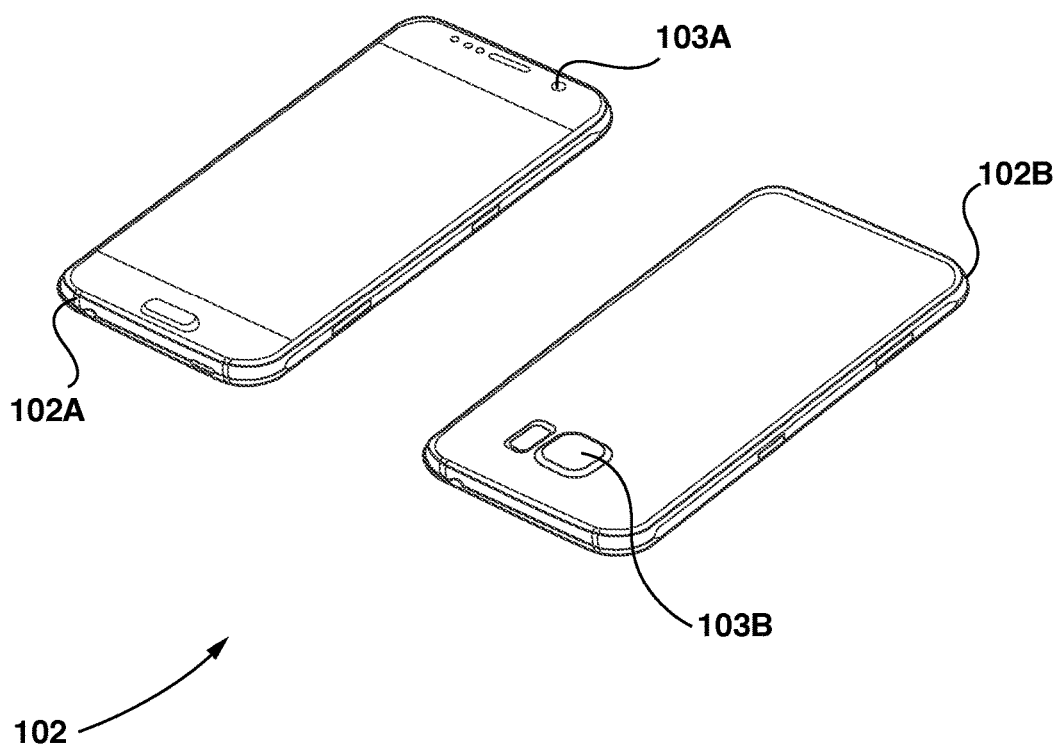
FIG. 8 depicts a front face of the electronic device of the system of FIG. 1 and a back face of the electronic device of the system of FIG. 1.

In the embodiment depicted in FIG. 1, the image-capturing interface 103 is implemented as a camera (it is noted that in some embodiments, the image-capturing interface 103 can be implemented as multiple cameras with one or more located on a front face depicted in FIG. 1 and/or one or more located a back face, which is not depicted, of the user electronic device 102). With brief reference to FIG. 8, there is depicted a front face of the electronic device 102A and a back face of the electronic device 102B. The front face of the electronic device 102A comprises a front face camera 103A and the back face of the electronic device 102B comprises a back face camera 103B. The back face camera 103B can be more convenient for capturing the digital image of the printed document 140. However, when the description below refers to the "camera" it applies to either one (or both) of the front face camera 103A or the back face camera 103B.

In an alternative non-limiting embodiment, the image-capturing interface 103 can be implemented as a scanner (not depicted) or any other capturing device (not depicted) for acquiring a digital version of a paper-based document.

As schematically depicted in FIG. 1, the user electronic device 102 comprises a processor 104. The processor 104 may comprise one or more processors and/or one or more microcontrollers configured to execute instructions and to carry out operations associated with the operation of the user electronic device 102. In various embodiments, the processor 104 may be implemented as a single-chip, multiple chips and/or other electrical components including one or more integrated circuits and printed circuit boards. The processor 104 may optionally contain a cache memory unit (not depicted) for temporary local storage of instructions, data, or computer addresses. By way of example, the processor 104 may include one or more processors or one or more controllers dedicated for certain processing tasks of the user electronic device 102 or a single multi-functional processor or controller.

The processor has access to a data storage device 106. The data storage device 106 may encompass one or more storage media and generally provide storage for data, computer code, and the like. By way of example, the data storage device 106 may include various tangible computer-readable storage media including Read-Only Memory (ROM) and/or Random-Access Memory (RAM). The data storage device 106 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to the processor 104.

The data storage device 106 may store inter alia a series of computer-readable instructions, which instructions when executed cause the processor 104 (as well as other components of the user electronic device 102) to execute the various operations described herein.

In various embodiments of the present technology, various components of the user electronic device 102 may be operably connected together by one or more buses (including hardware and/or software), the buses not being separately numbered. As an example and not by way of limitation, the one or more buses may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit (I$^2$C) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these.

The processor 104 has access to a network interface 108. The network interface 108 (which can be implemented as a network card or the like) is communicatively coupled to a communication network 110 for accessing one or more network nodes coupled thereto (such as a server 112). In some non-limiting embodiments of the present technology, the communication network 110 can be implemented as the Internet. In other embodiments of the present technology, the communication network 110 can be implemented differently, such as any wide-area communication network, local-area communication network, a private communication network and the like.

How a communication link (not separately numbered) between the network interface 108 and the communication network 110 is implemented will depend inter alia on how the user electronic device 102 is implemented. Merely as an example and not as a limitation, in those embodiments of the present technology where the user electronic device 102 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the user electronic device 102 is implemented as a notebook computer, the communication link can be either wireless (such as Wireless Fidelity, or WiFi® for short, Bluetooth® or the like) or wired (such as an Ethernet based connection).

The server 112 can be implemented as a conventional computer server. In an example of an embodiment of the present technology, the server 112 can be implemented as a Dell™ PowerEdge™ Server running the Microsoft™ Windows Server™ operating system. Needless to say, the server 112 can be implemented in any other suitable hardware and/or software and/or firmware or a combination thereof. In the depicted non-limiting embodiment of present technology, the server 112 is a single server. In alternative non-limiting embodiments of the present technology, the functionality of the server 112 may be distributed and may be implemented via multiple servers.

The implementation of the server 112 is well known to the person skilled in the art of the present technology. However, briefly speaking, the server 112 comprises a communication interface (not depicted) structured and configured to communicate with various entities (such as the user electronic device 102 and other devices potentially coupled to the communication network 110). The server 112 further comprises at least one computer processor (not depicted) operationally connected with the communication interface and structured and configured to execute various processes to be described herein.

The server 112 can execute a server-based OCR function 113, which can be implemented as ABBYY Recognition Server™ OCR function.

In accordance with embodiments of the present technology, the processor 104 is configured to execute a digital image compressor 114 and an OCR suitability classifier 116. Each of the digital image compressor 114 and the OCR suitability classifier 116 can be executed in software, hardware, firmware or a combination thereof.

Functionality of the digital image compressor 114 and the OCR suitability classifier 116 will now be explained in greater details with reference to non-limiting embodiments thereof.

Digital Image Compressor 114

Figure 2:
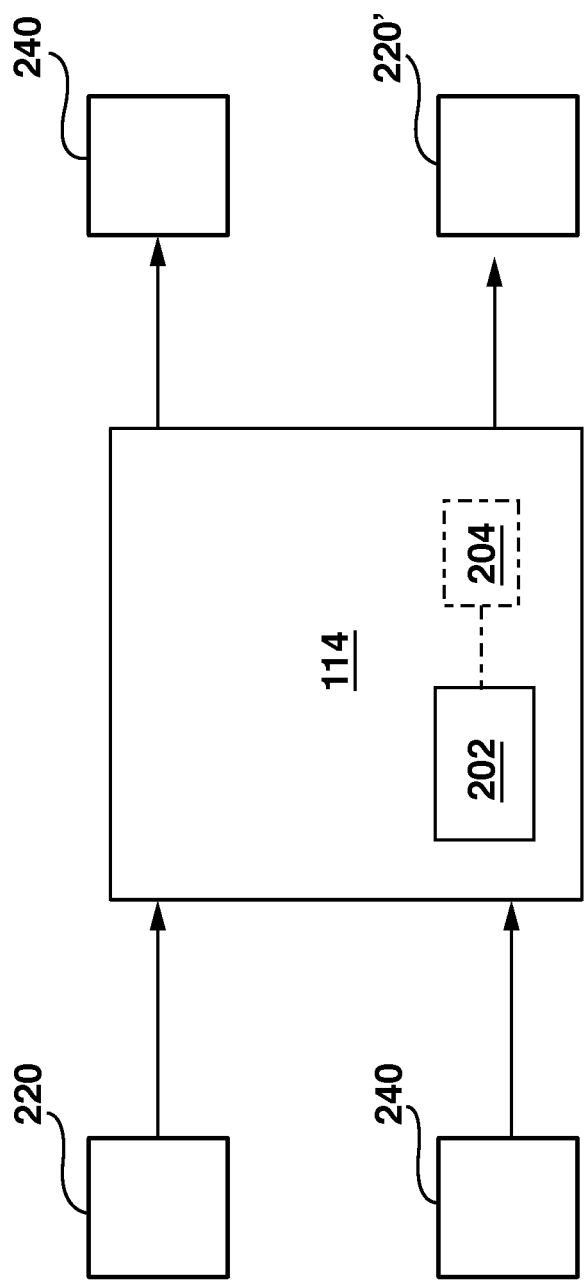
FIG. 2 depicts a schematic representation of a compression and de-compression function executed by a digital image compressor of the system of FIG. 1.

With reference to FIG. 2, there is a depicted a schematic representation of a compression and de-compression function executed by the digital image compressor 114. Broadly speaking, the digital image compressor 114 is configured to compress the digital image 220 (which contains digital representation of the printed document 140) to create a compressed digital image 240.

In some embodiments of the present technology, the digital image compressor 114 is configured to create a grayscale image (not depicted) based on the digital image 220. In the description to be presented herein below, it shall be assumed that the digital image 220 depicted in FIG. 2 is a grayscale image generated based on an original version of the digital image 220. But it should be also understood that the embodiments of the present technology can be implemented without conversion of the digital image 220 into the grayscale image thereof.

By the same token, the digital image compressor 114 is configured to de-compress the compressed digital image 240 to create a de-compressed digital image 220'.

To that end, the digital image compressor 114 executes a compression algorithm 202. The compression algorithm 202 can be implemented as a codec. The compression algorithm 202 can be implemented as a lossless data compression algorithm, a lossy data compression algorithm, or any other suitable compression algorithm. The nature of the compression algorithm 202 used is not particularly limited and just as non-limiting examples, the compression algorithm 202 can be implemented as an algorithm for reducing geometric size using extrapolation, JPEG algorithm or JPEG 2000 algorithm.

The compression algorithm 202 is associated with a compression parameter 204. The compression parameter 204 can be a compression coefficient $k_i$. In some embodiments of the present technology, the compression coefficient $k_i$ can be a single-dimensional value. In alternative non-limiting embodiments, the compression coefficient $k_i$ can be a multi-dimension value.

Inventors of the present technology have conducted experiments and they believe that the JPEG 2000 algorithm allows for higher compression coefficient compression coefficient $k_i$ compared to the JPEG (at least 1.5 times higher value of the compression coefficient $k_i$) with the same quality of output of the server-based OCR function 113 at around 98-99% accuracy (as will be described below). The JPEG 2000 also allows generating the compressed digital image 240 having a size of about two to three Kilobytes. At the same time, the time required for compression using JPEG 2000 compared to JPEG is around two-three times longer.

Thus, it is expected, that a person skilled in the art can select the exact compression algorithm (JPEG, JPEG2000, etc.) based on a trade-off between the level of compression desired and the time required to output the compressed digital image 240.

OCR Suitability Classifier 116

Broadly speaking, the OCR suitability classifier 116 is configured to determine an OCR quality parameter associated with the digital document 220. It should be expressly understood that the OCR quality parameter may be analyzed even without actually performing OCR function on the digital document 220.

The OCR quality parameter is indicative of whether the digital document 220 (once compressed using digital image compressor 114 and de-compressed at the server 112 using a digital image compressor (not depicted) similar to the digital image compressor 114) is suitable for producing a suitable outcome of the server-based OCR function 113. In other words, OCR quality parameter is indicative of whether the digital document 220 once compressed by the digital image compressor 114 and decompressed by the server 112 is suitable to produce a recognized-text digital document containing digital text representative of the text 142 with an acceptable quality (such as, for example, a pre-determined error margin which can be indicative of an acceptable number or ratio of errors per page or per entire document).

In some embodiments of the present technology, the pre-determined error margin can be between one and three percent level of errors. In other embodiments, the pre-determined error margin can be between zero and two percent level of errors. In yet further embodiments, the pre-determined error margin can be a numerical value of a maximum number of errors per page of the recognized-text digital document or per the entirety of the recognized-text digital document.

First Approach

In some non-limiting embodiments of the present technology, the OCR suitability classifier 116 is configured to predict the OCR quality parameter associated with the digital image 220 based on a given value of the compression parameter (such as, for example, compression coefficient $k_i$) used/to be used for compressing and de-compressing of the digital image 220. This predicted OCR quality parameter can then be used for determining if the given value of the compression parameter (such as, for example, compression coefficient $k_i$) is suitable for producing a suitable output of the server-based OCR function 113.

Second Approach

In other non-limiting embodiments of the present technology, the OCR suitability classifier 116 is configured to predict the OCR quality parameter associated with the digital image 220 by iteratively predicting a respective OCR quality parameter associated with a given value of the compression parameter of at least two compression parameters (such as, for example, compression coefficients $k_1$, $k_2$, etc.) used/to be used for compressing and de-compressing of the digital image 220.

The OCR suitability classifier 116 can select the given value of the OCR quality parameter that is suitable for producing a suitable output of the server-based OCR function 113 (while delivering an acceptable level of digital document compression).

Within the first and second approaches, the OCR suitability classifier 116 can determine the OCR quality parameter as follows.

The OCR suitability classifier 116 can trigger the digital image compressor 114 to compress the digital image 220 using the compression algorithm 202 to create a test compressed digital image (which is similar to the compressed digital image 240), the compression algorithm 202 using a specific compression parameter (such as a specific value compression coefficients $k_S$).

The digital image compressor 114 then de-compresses the test compressed digital image to create a decompressed test digital image (similar to the decompressed digital image 220').

The OCR suitability classifier 116 analyzes the decompressed test digital image (the details of the analysis process will be described in greater detail herein below) to predict the OCR quality parameter, the OCR quality parameter being indicative of whether the decompressed test digital image having been compressed using the specific compression parameter (such as a specific value compression coefficients $k_S$) is suitable to render an acceptable outcome by the server-based OCR processing.

Third Approach

In some embodiments of the present technology, the OCR suitability classifier 116 can predict the OCR quality parameter based on the primary features of the digital image 220.

More specifically, the prediction the OCR quality parameter includes executing the OCR suitability classifier 116, the OCR suitability classifier 116 having been trained to predict the OCR quality parameter based on primary characteristics associated with the digital image 220 without having to compress and de-compress the digital image 220 via a compressed digital image 240 described above with reference to the first and second approaches. The primary characteristics include one of (as an example): font size, number of characters, number of characters per page, brightness of the image, contrast level of the image, etc.

Irrespective of which one of the three approaches described above is used, in some embodiments of the present technology, the OCR suitability classifier 116 can be implemented as a machine learning algorithm (MLA). In alternative embodiments of the present technology, the OCR suitability classifier 116 can be implemented as a heuristic analysis, and the like.

In those embodiments where the OCR suitability classifier 116 is implemented as the MLA, the MLA can be implemented as a supervised learning or a semi-supervised learning based MLA. As a non-limiting list of examples, the MLA can be implemented as:

Random Forests (or random decision forests);
Artificial neural network;
Bayesian statistics;
Back propagation;
Gaussian process regression;
Decision trees;
Nearest Neighbor Algorithm;
Support Vector Machine;
and the like.

In those embodiments, where the OCR suitability classifier 116 is implemented as a machine learning algorithm, the OCR suitability classifier 116 needs to be trained and validated before it can be used.

Training Phase of the OCR Suitability Classifier 116

Figure 3:
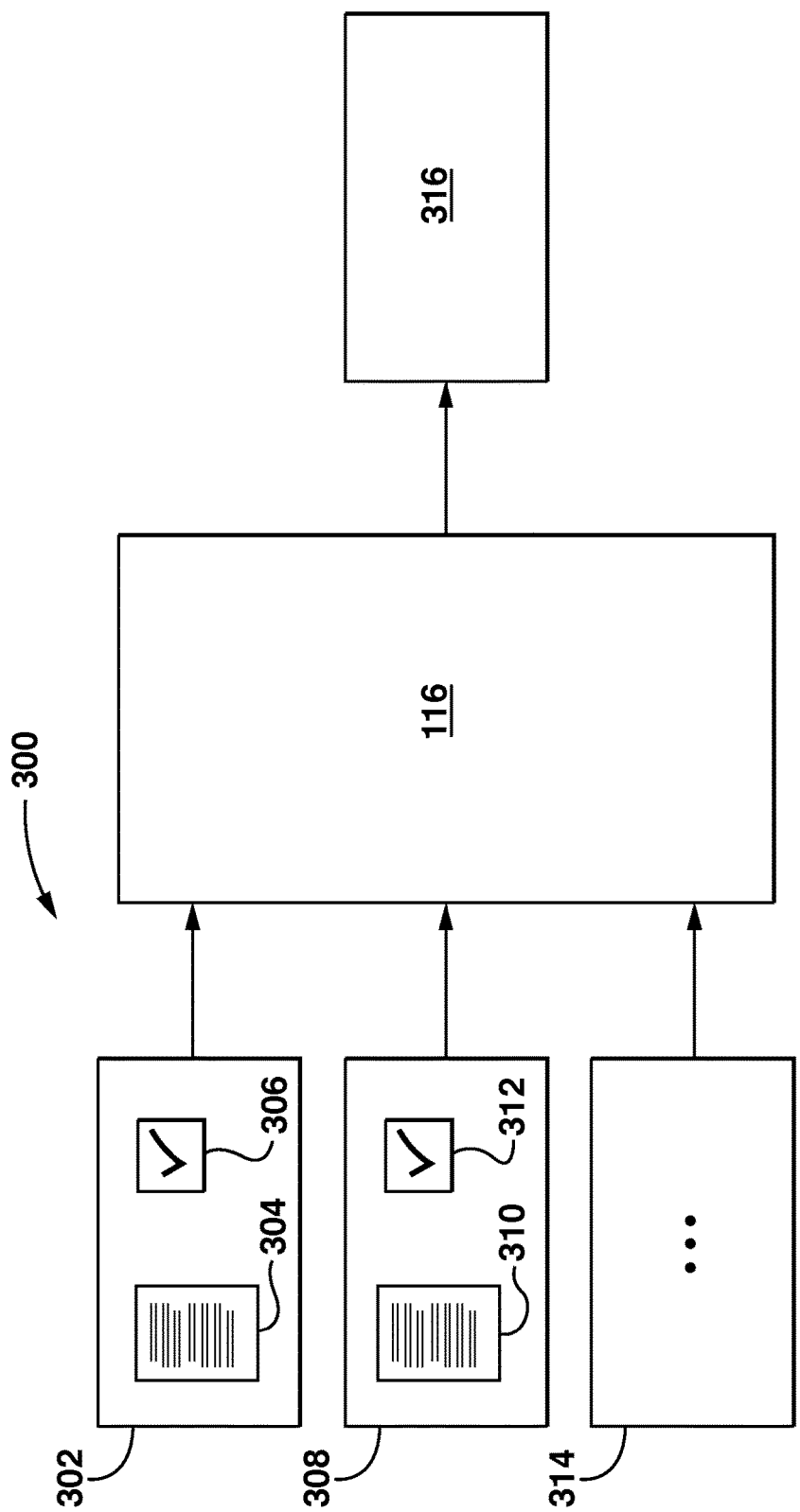
FIG. 3 depicts a schematic representation of training of an OCR suitability classifier of the system of FIG. 1.

FIG. 3 depicts a schematic representation of training of the OCR suitability classifier 116.

Training of the OCR suitability classifier 116 is executed using a set of training objects 300, including a first training object 302, a second training object 308 and a plurality of additional training objects 314. The number of training objects within the plurality of additional training objects 314 is not particularly limited, but generally includes a number of training objects, each training object in the number of training objects including a training digital image with an associated training label.

More specifically, the first training object 302 includes a first training digital image 304 and a first assigned label 306. The first training digital image 304 is associated with a compression parameter (such as a first compression coefficients $k_1$) that was used to create the first training digital image 304 from its original digital image (not depicted). From the perspective of the MLA, the compression parameter is a "feature" of the first training digital image 304. The first assigned label 306 is representative of a level of errors associated with an output of the server-based OCR function 113 performed on a de-compressed version of the first training digital image 304.

The second training object 308 includes a second training digital image 310 and a second assigned label 312. The second training digital image 310 is associated with a compression parameter (such as a second compression coefficients $k_2$) that was used to create the second training digital image 310 from its original digital image (not depicted). From the perspective of the MLA, the compression parameter is a "feature" of the second training digital image 310. The second assigned label 312 is represented by a level of errors associated with an output of the server-based OCR function 113 performed on a de-compressed version of the second training digital image 310.

It is noted that depending on the particular implementation of the compression coefficient $k_i$ (such as a single-dimensional value or a multi-dimensional value), the optimization algorithm for the selection of the specific value of the compression coefficient $k_i$ by the OCR suitability classifier 116 can be any suitable iterative optimization algorithm. Such as, but not limited to, gradient descent, Newton method, differential evolution and the like. The target for the optimization can comprise the predicted OCR quality parameter and the size of the compressed digital image 240 compressed with the compression coefficient $k_i$.

First and Second Approachas

As part of the training phase, the OCR suitability classifier 116 generates an MLA formula 316—algorithm that is used for predicting a target (i.e. the OCR quality parameter) based at least on the compression parameter associated with the digital image 220, the compressed digital image 240 or the decompressed digital image 220' submitted for processing to the OCR suitability classifier 116.

In some embodiments of the present technology, the outputted target (i.e. the OCR quality parameter) is associated with a probability indicator.

The OCR quality parameter and/or the probability indicator can be compared to a predetermined threshold. If the OCR quality parameter and/or the probability indicator are above or equal to the pre-determined threshold, the digital image 220 being processed is determined to be suitable for the server-based OCR function.

If on the other hand, the OCR quality parameter is below the pre-determined threshold, the processed digital image 220 is determined not to be suitable for the server-based OCR function.

The pre-determined threshold can be for example, 1-2% or any other suitable value.

Alternatively, the OCR quality parameter can be iteratively determined for two or more compression parameters to determine a specific one of the two or more compression parameters that provides for the highest OCR quality parameter (thus indicative of the higher suitability to produce a suitable output of the server-based OCR function). It should be noted that the suitability of the output of the server-based OCR function could be defined in terms of the level of errors in the outputted recognized-text document.

Third Approach

In alternative non-limiting embodiments, as part of the training phase, the OCR suitability classifier 116 generates the MLA formula 316—an algorithm that is used for predicting the target (i.e. the OCR quality parameter) based at least on the primary characteristics of the digital image 220 submitted for processing to the OCR suitability classifier 116.

In some embodiments of the present technology, the outputted target (i.e. the OCR quality parameter) is associated with a probability indicator.

Validation of the OCR Suitability Classifier 116

Once the OCR suitability classifier 116 is trained, a validation phase of the OCR suitability classifier 116 commences.

In order to execute the validation phase, the OCR suitability classifier 116 is presented with a plurality of validation objects. A given validation object can be similar to the first training object 302 and/or the second training object 308 (albeit having content of the digital images not yet seen by the OCR suitability classifier 116).

More specifically, a given validation document is submitted to the OCR suitability classifier 116. The OCR suitability classifier 116 using the trained MLA formula 316, analyzes image features of the given validation document and outputs a prediction as to the OCR quality parameter. The outputted prediction is then compared with the assigned label (i.e. ground truth label for the given validation document) for the given validation document and any errors in prediction are fed back into the OCR suitability classifier 116. The validation and re-training processes are repeated until the errors (either number of errors or the margin of error) fall below a pre-determined acceptable error threshold (based on a validation metric).

The type of the validation metric used is not limited and depends on what type of the OCR suitability classifier 116 is used. Some examples of the validation metric include: precision metric, recall metric, F-measure metric and the like. It is believed that validation metric types are well known to those of ordinary skill in the art and, as such, they will not be described herein at length.

Process for Determining the OCR Quality Parameter

One example of the process for determining the OCR quality parameter is described in a co-owned US patent application bearing an application Ser. No. 15/165,512 entitled "METHOD AND SYSTEM THAT DETERMINE [S] THE SUITABILITY OF A DOCUMENT IMAGE FOR OPTICAL CHARACTER RECOGNITION AND OTHER IMAGE PROCESSING" and filed with the United States Patent and Trademark Office (USPTO) on May 26, 2016; content of which application is hereby incorporated by reference in all those jurisdictions where such incorporation is permitted by law.

It should be, however, noted that any other suitable process for determining the OCR quality parameter could be used.

Figure 4:
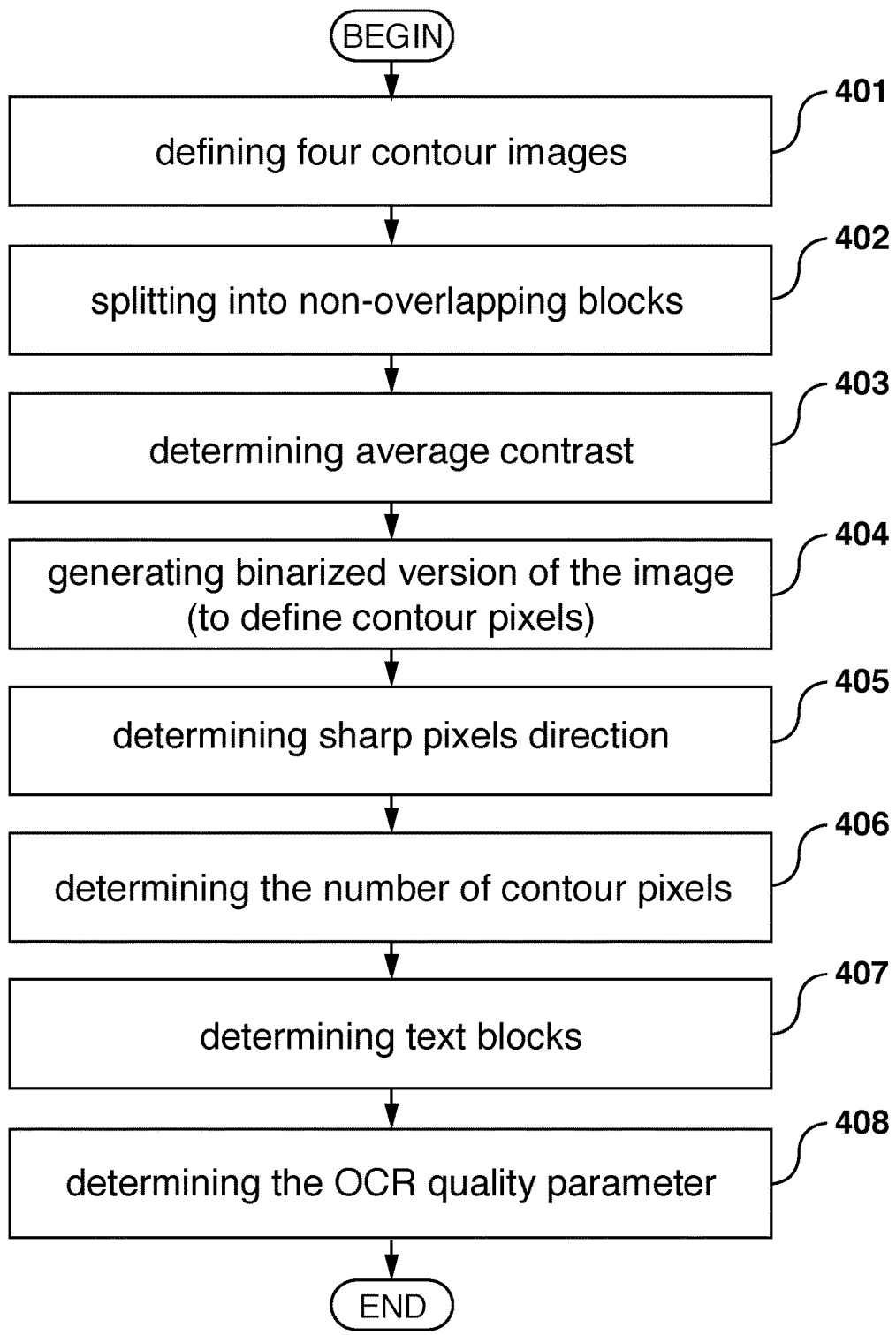
FIG. 4 depicts a block diagram of a non-limiting embodiment of a process for determining the OCR quality parameter, the process executed by the OCR suitability classifier of FIG. 4.

One example of the process will be described briefly herein below. With reference to FIG. 4 there is depicted a block diagram of a non-limiting embodiment of a process 400 for determining the OCR quality parameter.

Step 401—Defining Four Contour Images

At step 401, the OCR suitability classifier 116 generates four different contour images from a gray scale digital image. Each of the four different contour images comprises contours of a respective direction of the gray scale digital image.

In some embodiments of the present technology, the grayscale digital image is the de-compressed digital image 220' (i.e. a grayscale digital image that has been produced by applying the compression algorithm 202 to compress the digital image 220 and then de-compress the resultant compressed digital image 240).

In other embodiments of the present technology, the grayscale digital image is compressed digital image 240 (i.e. without the need to de-compress the compressed digital image 240 using the compression algorithm 202). In these embodiments, the OCR suitability classifier 116 can use features of the compressed digital image 240. As an example only, in those embodiments where the compression algorithm is implemented as JPEG, the features of the JPEG-compressed digital image 240 can include (but are not limited to): a number of non-zero coefficients of a discrete cosine transform (DCT) after quantization, a frequency distribution thereof, etc.

In some embodiments of the present technology, the OCR suitability classifier 116 can use both features of the compressed digital image 240 and features of the de-compressed digital image 220'. In other embodiments, the OCR suitability classifier 116 can use features of the compressed digital image 240 without having to de-compress the compressed digital image 240 (potentially even further reducing the time required to predict the OCR quality parameter).

In some embodiments of the present technology, as part of step 401, the grayscale decompressed digital image 220' is filtered using, as an example, an edge detection algorithm (such as Sobel-Feldman operator, a.k.a. Sobel filter (−1, 0, 1)). The Sobel filter can be applied in 4 directions—x and y axis, as well a respective axis forming 45 and 135 degrees with the x-axis. The absolute values generated by the Sobel filter form the contour images.

Step 402—Splitting into Non-Overlapping Blocks

At step 402, the OCR suitability classifier 116 splits the de-compressed digital image 220' into non-overlapping blocks. The size of the non-overlapping blocks is selected such that the brightness, noise and blur do not significantly vary within a given block.

Step 403—Determining Average Contrast

At step 403, the OCR suitability classifier 116 determines an average contrast value C associated with the de-compressed digital image 220'.

In some embodiments of the present technology, the OCR suitability classifier 116 executes a histogram-based analysis for determining the contrast value C for the given block defined in step 402.

More specifically, in some embodiments of the present technology, the OCR suitability classifier 116 generates a brightness histogram. Using the brightness histogram, the OCR suitability classifier 116 determines a minimum and a maximum of the brightness value such that 0.1% of all pixels of a given block have brightness lesser than the minimum value and 0.1% of all pixels of the given block have brightness higher than the maximum.

The average contrast value C is determined as a difference between the maximum value and the minimum value.

Step 404—Generating Binary Version of the Image (to Define Contour Pixels)

At stem 404, the OCR suitability classifier 116 generates, for each block, a binarized version of the de-compressed digital image 220'. In some embodiments, the binarization is executed using an intensity-value-based thresholding algorithm. More specifically, a binarization threshold of a half-sum of the maximum brightness value and the minimum brightness value of a given block can be used for the binarization process.

The OCR suitability classifier 116 determines the number of binarized contour pixels of the binarized image within the given block. As an example, a black pixel can be determined to be a contour pixel if it has a neighboring white pixel (in either a vertical or horizontal direction).

Step 405—Determining Sharp Pixels

At step 405, the OCR suitability classifier 116, for each block of the four different contour images, determines a number of sharp pixels. The determination can be executed based on a sharpness of the contour image over a first threshold $T_1$.

In some embodiments of the present technology, the first threshold $T_1$ is determined by decreasing the threshold down from the value 255 until the sum of the number of sharp pixels in all of the contour image blocks corresponding to the currently considered block is greater than or equal to the number of contour pixels computed from the binary version of the given block.

Step 406—Determining the Number of Contour Pixels

At step 406, the OCR suitability classifier 116 determines the number of contour pixels. In some embodiments of the present technology, the OCR suitability classifier 116 uses a second threshold $T_2$. The way the second threshold T2 is calculated is not particularly limited. In some embodiments of the present technology, the OCR suitability classifier 116 calculates a respective second threshold T2 for each block.

In other embodiments, the OCR suitability classifier 116 assigns a value to the second threshold $T_2$ that is equal to a specific fraction of the first threshold $T_1$. As such, the second threshold $T_2$ can be determined as:

$$T_2 = k * T_1 \qquad \text{(Formula 1)}$$

Where k is less than 1. As an example, the k can be 0.5.

Alternatively, the second threshold $T_2$ can be set as a pre-determined number of noise contour pixels.

Step 407—Determining Text Blocks

At step 407, the OCR suitability classifier 116 determines text blocks. In some embodiments of the present technology, the OCR suitability classifier 116 identifies text blocks with the contour pixels exceeding a pre-determined proportion of all pixels in the given block (such as 3-5%). The OCR suitability classifier 116 can also determine the text blocks using a condition that black pixels (or white pixels in case of inverted text) in the binarized image (determined at step 405 above) to be less than a particular proportion value (for example, 20-30%). The OCR suitability classifier 116 can further determine the text blocks based on the contrast C value to be above a pre-determined level.

The OCR suitability classifier 116 then determines those text blocks that have the lowest font size. In order to do so, the OCR suitability classifier 116 determines the font size of all blocks. This can be executed in any known way. Just as example, the OCR suitability classifier 116 can generate histograms of Run Line Encoding (RLE) lines. Alternatively, the OCR suitability classifier 116 can generate the size of linked components of the binarized images.

The OCR suitability classifier 116 then selects those text blocks with the font size that is lower than the most probable value of the histogram with a pre-determined value added thereto. The pre-determined value can be randomly selected or can be empirically determined.

Step 408—Determining the OCR Quality Parameter

At step 408, the OCR suitability classifier 116 determines the OCR quality parameter as a ratio of all sharp pixels to all contour objects of the text blocks selected at step 407.

The OCR suitability classifier 116 then uses the OCR quality parameter determined at step 408 with the characteristics of the binarized images determined in step 404 to predict a number of errors in the output of the server-based OCR function 113.

Without being limitive, the OCR suitability classifier 116 can use the following features in predicting the number of errors in the output of the server-based OCR function 113 (i.e. the OCR quality parameter). The OCR suitability classifier 116 can use a quality assessment of the contour pixels, statistical data associated with the contour pixels (minimum, maximum, average, etc.). Additionally or alternatively, the OCR suitability classifier 116 can use a ratio of contour pixels in the binarized image and the black pixels (or white pixels in case of the reverse image), histogram of the RLE-line sizes, features of the linked components, a ratio of comparatively small black or white lines/components, a ratio of height to weight of a symbol, etc.

Figure 5:
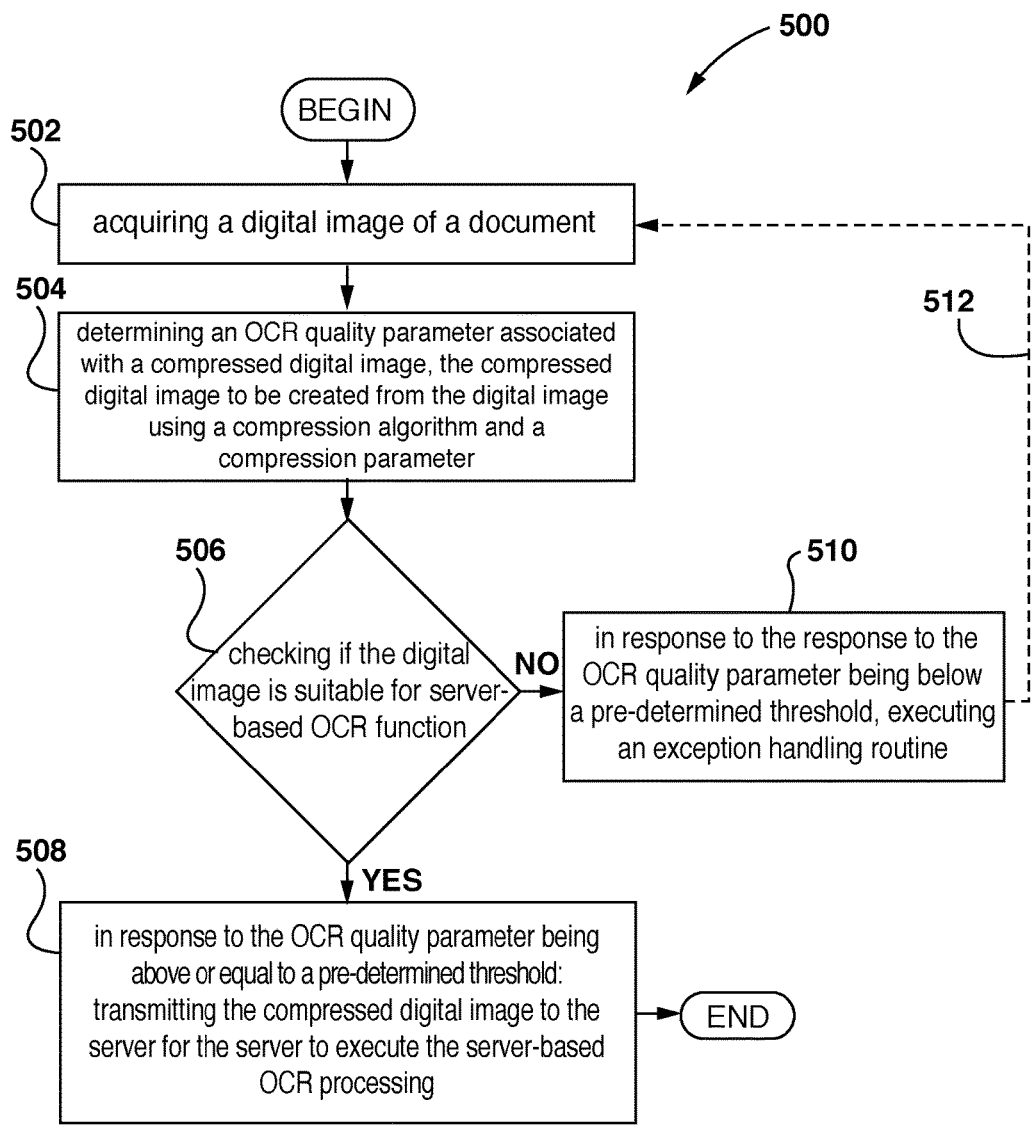
FIG. 5 depicts a non limiting embodiment of a block diagram of a method of determining a document suitability for server-based OCR processing, the method executable by the OCR suitability classifier once trained by the process of FIG. 3.

Given the architecture described above, it is possible to execute a method of determining a document suitability for server-based OCR processing. With reference to FIG. 5, there is depicted a non-limiting embodiment of a block diagram of a method 500 of determining the document suitability for server-based OCR processing. The processor 104 can execute the method 500.

Step 502—Acquiring a Digital Image of a Document

At step 502, the OCR suitability classifier 116 acquires the digital image 220 of a document (such as the printed document 140).

In some embodiments of the present technology, the OCR suitability classifier 116 can acquire the digital image 220 via the image-capturing interface 103. As has been noted above, the image-capturing interface 103 can be a camera, a scanner or the like. As such, at step 502, the OCR suitability classifier 116 receives the digital image 220 representative of the printed document 140 that the user is desirous of having text-recognized.

Alternatively, the OCR suitability classifier 116 can acquire the digital image 220 by retrieving it from the data storage device 106 or by receiving it via the communication network 110.

Step 504—Determining an OCR Quality Parameter Associated with a Compressed Digital Image, the Compressed Digital Image to be Created from the Digital Image Using a Compression Algorithm and a Compression Parameter At step 504, the OCR suitability classifier 116 determines an OCR quality parameter associated with a compressed digital image 240, the compressed digital image 240 having been created or to be created from the digital image 220 using a compression algorithm 202 and a compression parameter (such as the compression coefficient $K_i$).

Step 504 can be implemented using various techniques, two of which will be described herein below.

Step 506—Checking if the Digital Image is Suitable for Server-Based OCR Function At step 506, the OCR suitability classifier 116 checks if the digital image 220 is suitable for server-based OCR function 113. More specifically, the OCR suitability classifier 116 determines if the digital image 220 (once compressed and de-compressed) is susceptible to producing an acceptable output of the server-based OCR function 113.

In some embodiments of the present technology, as part of step 506, the OCR suitability classifier 116 compares the OCR quality parameter of the digital image 220 to a pre-determine threshold.

Step 508—in Response to the OCR Quality Parameter being Above or Equal to a Pre-Determined Threshold: Transmitting the Compressed Digital Image to the Server for the Server to Execute the Server-Based OCR Processing At step 508 (the YES branch of step 506), the OCR suitability classifier 116, in response to the OCR quality parameter being above or equal to a pre-determined threshold, transmits the compressed digital image 240 to the server 112 for the server 112 to execute the server-based OCR processing 113. The OCR suitability classifier 116 transmits the compressed digital image 240 having been created from the digital image 220 using the compression algorithm 202 and the compression parameter $k_i$ to create the compressed digital image 240.

In some alternative embodiments of the present technology, the OCR suitability classifier 116 further causes the digital image compressor 114 to compress the digital image 220 using the compression algorithm 202 and the compression parameter $k_i$ to create the compressed digital image 240. It is noted that the digital image compressor 114 uses the same compression parameter $k_i$ for which was used for determining the OCR quality parameter in step 504.

Step 510—in Response to the Response to the OCR Quality Parameter being Below a Pre-Determined Threshold, Executing an Exception Handling Routine.

At step 510 (the NO branch of step 506), in response to the response to the OCR quality parameter being below a pre-determined threshold, the OCR suitability classifier 116 executed executes an exception handling routine.

The exception handling routine can include not executing: compressing the digital image using the compression algorithm and the compression parameter to create the compressed digital image; transmitting the compressed digital image to the server for the server to execute the server-based OCR processing.

Alternatively or additionally, the exception handling routine can cause the image-capturing interface to recapture the digital image.

The method 500 then terminates.

Figure 6:
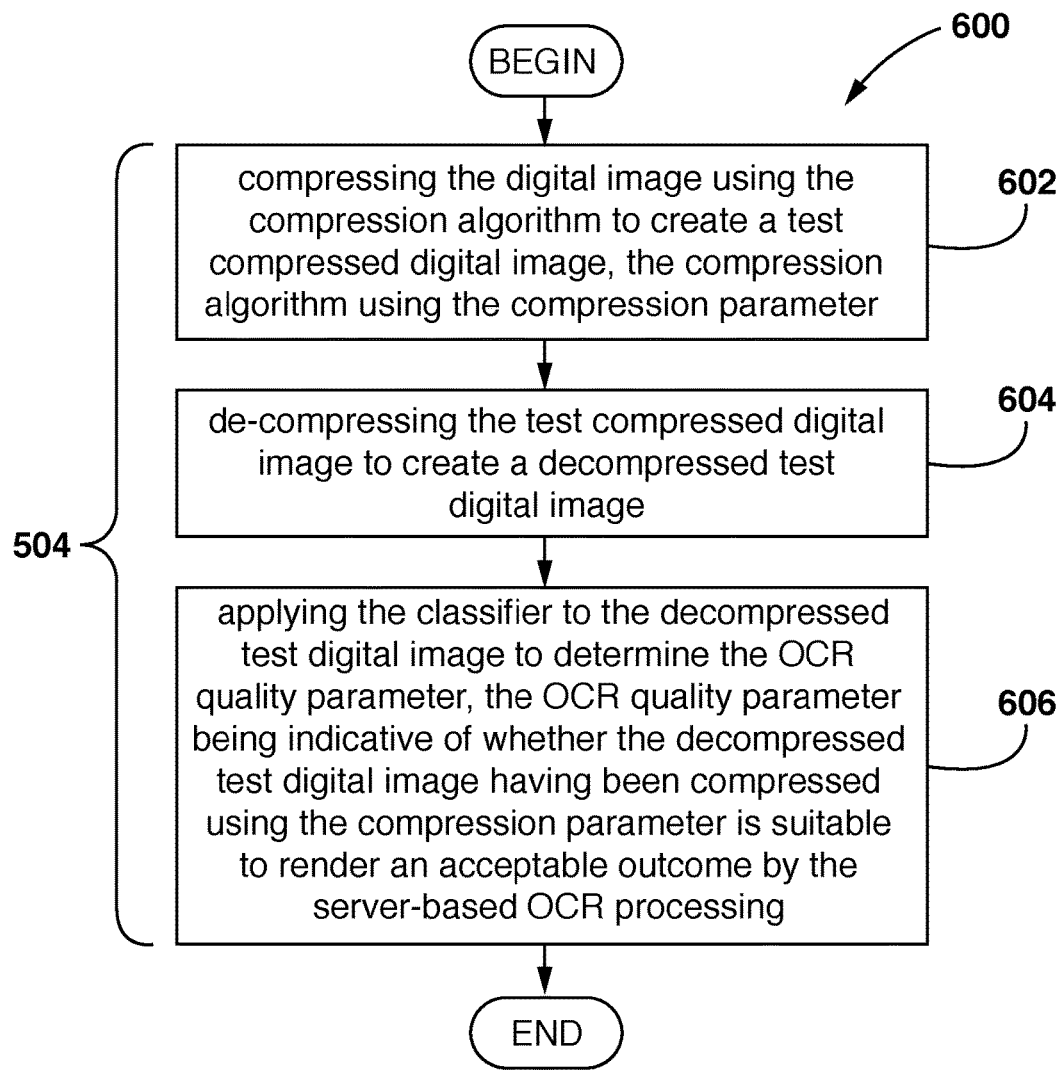
FIG. 6 depicts a first non-limiting embodiment of a block diagram of a method for determining an OCR quality parameter, the method executable as part of the method of FIG. 5.

With reference to FIG. 6, there is depicted a non-limiting embodiment of a block diagram of a method 600 of determining the OCR quality parameter. The method 600 is a first embodiment of implementing step 504 of the method 500. The processor 104 can execute the method 600.

Step 602—Compressing the Digital Image Using the Compression Algorithm to Create a Test Compressed Digital Image, the Compression Algorithm Using the Compression Parameter At step 602, the digital image compressor 114 compresses the digital image 220 using the compression algorithm 202 to create a test compressed digital image, the compression algorithm 202 using the compression parameter (such as the compression coefficient $k_i$).

It is noted that the term "test compressed digital image" refers to an image that is substantially similar to the compressed digital image 240, albeit created by the digital image compressor 114 for the purposes of determining the OCR quality parameter.

Step 604—De-Compressing the Test Compressed Digital Image to Create a Decompressed Test Digital Image At step 604, the digital image compressor 114 de-compresses the test compressed digital image to create a decompressed test digital image. It is noted that the decompressed test digital image is substantially similar to the decompressed digital image 220' described above, albeit created by the digital image compressor 114 for the purposes of determining the OCR quality parameter.

Step 606—Applying the Classifier to the Decompressed Test Digital Image to Determine the OCR Quality Parameter, the OCR Quality Parameter being Indicative of Whether the Decompressed Test Digital Image Having been Compressed Using the Compression Parameter is Suitable to Render an Acceptable Outcome by the Server-Based OCR Processing At step 606, the OCR suitability classifier 116 is applied to the de-compressed test digital image to determine the OCR quality parameter, the OCR quality parameter being indicative of whether the decompressed test digital image 220' having been compressed using the compression parameter is suitable to render an acceptable outcome by the server-based OCR processing.

It should be noted that in some embodiments, of the OCR quality parameter is found to be indicative of the digital image 220 being suitable for executing the server-based OCR function 113. Rather than compressing the digital image 220 again, the processor 104 can use the already created compressed test digital image (which in these embodiments can be stored in the data storage device 106).

The method 600 can then terminate.

Figure 7:
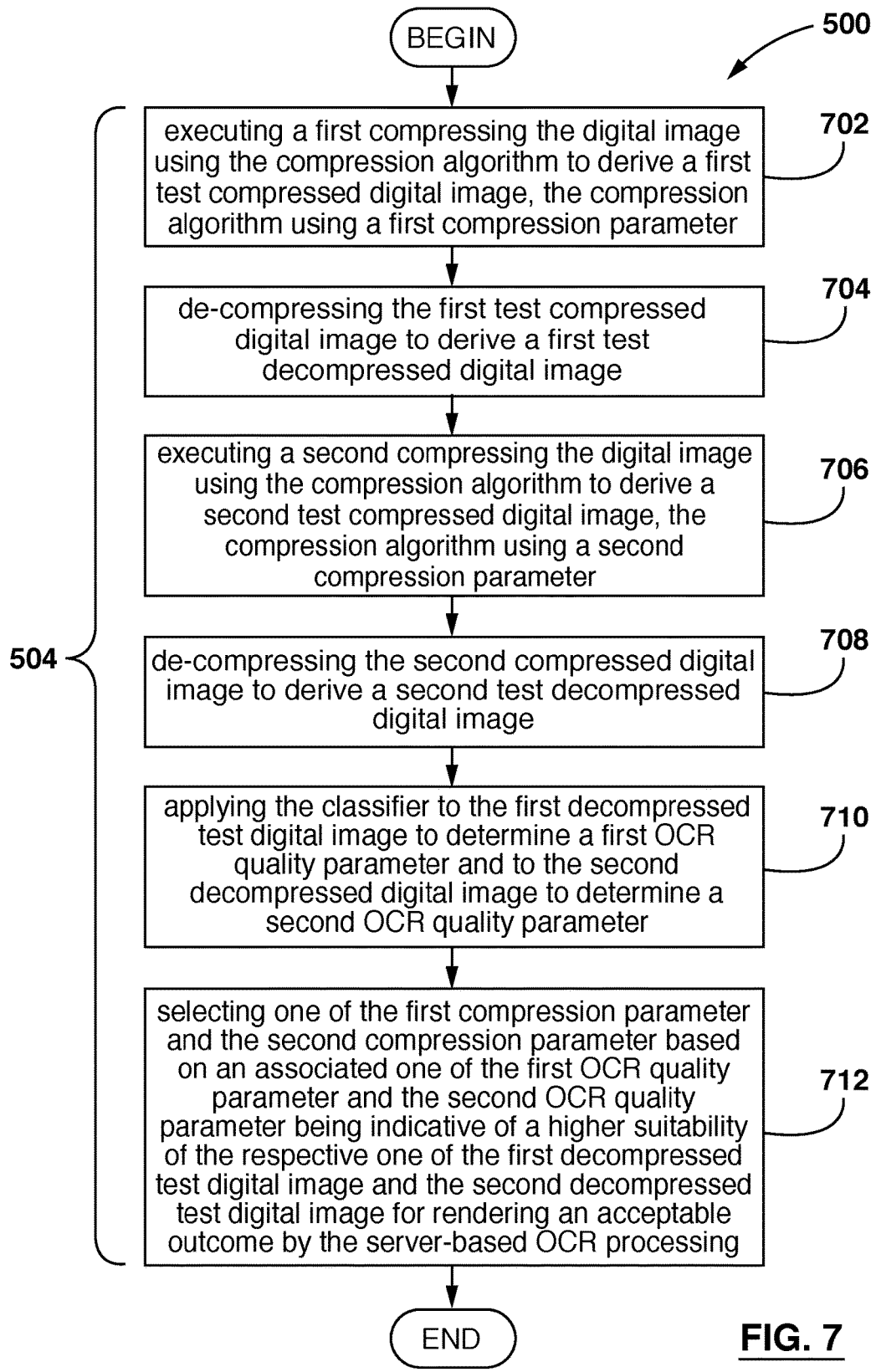
FIG. 7 depicts a second non-limiting embodiment of a block diagram of a method for determining an OCR quality parameter, the method executable as part of the method of FIG. 5.

With reference to FIG. 7, there is depicted a non-limiting embodiment of a block diagram of a method 700 of determining the OCR quality parameter. The method 700 is a second embodiment of implementing step 504 of the method 500. The processor 104 can execute the method 700.

Step 702—Executing a First Compressing the Digital Image Using the Compression Algorithm to Create a First Test Compressed Digital Image, the Compression Algorithm Using a First Compression Parameter At step 702, the digital image compressor 114 executes a first compressing the digital image 220 using the compression algorithm 202 to create a first test compressed digital image, the compression algorithm 202 using a first compression parameter (such as a first compression coefficient $k_1$).

Step 704—De-Compressing the First Test Compressed Digital Image to Create a First Test Decompressed Digital Image At step 704, the digital image compressor 114 executes de-compressing the first test compressed digital image to create a first test decompressed digital image.

Step 706—Executing a Second Compressing the Digital Image Using the Compression Algorithm to Derive a Second Test Compressed Digital Image, the Compression Algorithm Using a Second Compression Parameter At step 706, the digital image compressor 114 executes a second compressing the digital image 220 using the compression algorithm 202 to create a second test compressed digital image, the compression algorithm 202 using a second compression parameter (i.e. a second compression coefficient $k_2$ and it is noted that $k_2$ is different from $k_1$).

Step 708—De-Compressing the Second Compressed Digital Image to Derive a Second Test Decompressed Digital Image At step 708, the digital image compressor 114 executes de-compressing the second compressed digital image to create a second test decompressed digital image Step 710—Applying the Classifier to the First Decompressed Test Digital Image to Determine a First OCR Quality Parameter and to the Second Decompressed Digital Image to Determine a Second OCR Quality Parameter At step 710, the OCR suitability classifier 116 is applied to the first decompressed test digital image to determine a first OCR quality parameter and to the second decompressed digital image to determine a second OCR quality parameter.

Step 712—Selecting One of the First Compression Parameter and the Second Compression Parameter Based on an Associated One of the First OCR Quality Parameter and the Second OCR Quality Parameter being Indicative of a Higher Suitability of the Respective One of the First Decompressed Test Digital Image and the Second Decompressed Test Digital Image for Rendering an Acceptable Outcome by the Server-Based OCR Processing At step 712, the OCR suitability classifier 116 selects one of the first compression parameter and the second compression parameter based on an associated one of the first OCR quality parameter and the second OCR quality parameter being indicative of a higher suitability of the respective one of the first decompressed test digital image and the second decompressed test digital image for rendering an acceptable outcome by the server-based OCR processing 113

In these embodiments, the actual compressing of the digital image 220 with the compression algorithm 202 to create the compressed digital image 240 (for transmission to the server 112) is executed by using the selected one of the first compression parameter and the second compression parameter that was determined at step 712.

It is noted that steps 702-710 can be iteratively repeated for more than two compression parameters (i.e. different compression confidents $k_1, k_2, k_3 \ldots k_n$).

Once the processor 104 selects a digital document 220 with the appropriate OCR quality parameter, the processor 104 transmits the compressed digital image 240 that has been created using the appropriate compression parameter (for which the appropriate OCR quality parameter was determined) to the server 112. The server 112 then (i) receives the compressed digital image 240, (ii) de-compresses the compressed digital image 210 to obtain a de-compressed digital image 220', and (iii) executes the server-based OCR function 113 to generate a recognized text document based on the de-compressed digital image 220', the recognized text document based containing text generated on the basis of the de-compressed digital image 220'. The server 112 can then transmit back the recognized text document to the user electronic device 102 via the communication network 110 (in an original or a compressed state thereof).

It should be expressly understood that not all technical effects mentioned herein need to be obtained in each and every embodiment of the present technology. For example, embodiments of the present technology may be implemented without the user receiving the benefit some of these technical effects, while other embodiments may be implemented with the user obtaining other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of analyzing a digital image of a document, the method executable
    by a user electronic device, the method comprising:
    acquiring, by the user electronic device, the digital image of the document;
    analyzing, by a classifier executed by the user electronic device, an optical character recognition (OCR) quality parameter associated with a test digital image, the test digital image created by compressing and decompressing the digital image using a compression algorithm and a compression parameter; and
    in response to the OCR quality parameter being above or equal to a pre-determined threshold:
    transmitting a compressed digital image to a server for the server to execute the server-based OCR processing, the compressed digital image created from the digital image using the compression algorithm and the compression parameter.

2. The method of claim 1, wherein prior to the transmitting, the method further comprises compressing the digital image using the compression algorithm and the compression parameter to create the compressed digital image.

3. The method of claim 2, in response to the OCR quality parameter being below the pre-determined threshold not executing:
    compressing the digital image using the compression algorithm and the compression parameter to create the compressed digital image;

transmitting the compressed digital image to the server for the server to execute the server-based OCR processing.

4. The method of claim 3, wherein the method further comprises, in response to the OCR quality parameter being below the pre-determined threshold, causing user electronic device to acquire another digital image of the document.

5. The method of claim 1, wherein the analzying the OCR quality parameter comprises:
   compressing the digital image using the compression algorithm to create a test compressed digital image, the compression algorithm using the compression parameter;
   de-compressing the test compressed digital image to create a decompressed test digital image;
   applying the classifier to the decompressed test digital image to determine the OCR quality parameter, the OCR quality parameter being indicative of whether the decompressed test digital image having been compressed using the compression parameter is suitable to render an acceptable outcome by the server-based OCR processing.

6. The method of claim 1, wherein the analyzing the OCR quality parameter comprises:
   executing a first compressing the digital image using the compression algorithm to create a first test compressed digital image, the compression algorithm using a first compression parameter;
   de-compressing the first test compressed digital image to create a first test decompressed digital image;
   executing a second compressing the digital image using the compression algorithm to create a second test compressed digital image, the compression algorithm using a second compression parameter;
   de-compressing the second compressed digital image to create a second test decompressed digital image;
   applying the classifier to the first decompressed test digital image to determine a first OCR quality parameter and to the second decompressed digital image to determine a second OCR quality parameter;
   selecting one of the first compression parameter and the second compression parameter based on an associated one of the first OCR quality parameter and the second OCR quality parameter being indicative of a higher suitability of the respective one of the first decompressed test digital image and the second decompressed test digital image for rendering an acceptable outcome by the server-based OCR processing; and wherein the compressing the digital image using the compression algorithm to render the compressed digital image is executed by using the selected one of the first compression parameter and the second compression parameter.

7. The method of claim 1, wherein compression algorithm is implemented as a codec selected from at least one of: JPEG and JPEG 2000.

8. The method of claim 7, wherein the analyzing the OCR quality parameter associated with the test digital image is further based on compression data obtained from the codec.

9. The method of claim 1, wherein the classifier is implemented as a machine learning algorithm.

10. The method of claim 9, further comprising training the machine learning algorithm.

11. The method of claim 9, further comprising selecting those text blocks with the smallest font and wherein the determining the OCR quality parameter is executed on the selected text blocks with the smallest font.

12. The method of claim 1, wherein the analyzing the OCR quality parameter comprises:
   defining four contour images;
   splitting each of the four contour images into non-overlapping blocks;
   determining, for each of the four contour images, an average contrast;
   generating binary version of the image in order to define contour pixels;
   determining sharp pixels of each of the blocks;
   determining the number of contour pixels for each of the blocks;
   determining text blocks; and
   determining the OCR quality parameter based on the text blocks.

13. A system for analyzing a digital image of a document, the system comprising:
   a memory; and
   a processor, operatively coupled to the memory, being configured to:
   acquire, the digital image of the document;
   analyze, using a classifier executed by the processor, an OCR quality parameter associated with a test digital image, the test digital image created by compressing and decompressing the digital image using a compression algorithm and a compression parameter; and
   in response to the OCR quality parameter being above or equal to a pre-determined threshold:
   transmit a compressed digital image to a server for the server to execute the server-based OCR processing, the compressed digital image created from the digital image using the compression algorithm and the compression parameter.

14. The system of claim 13, wherein the processor is further configured to compress the digital image using the compression algorithm and the compression parameter to create the compressed digital image.

15. The system of claim 14, the processor being further configured, in response to the OCR quality parameter being below the pre-determined threshold not to execute:
   compressing the digital image using the compression algorithm and the compression parameter to create the compressed digital image;
   transmitting the compressed digital image to the server for the server to execute the server-based OCR processing.

16. The system of claim 15, wherein the processor is further configured, in response to the OCR quality parameter being below the pre-determined threshold, to cause user electronic device to acquire another digital image of the document.

17. The system of claim 13, wherein to analyze the OCR quality parameter, the processor is configured to:
   compress the digital image using the compression algorithm to create a test compressed digital image, the compression algorithm using the compression parameter;
   de-compress the test compressed digital image to create a decompressed test digital image;
   apply the classifier to the decompressed test digital image to determine the OCR quality parameter, the OCR quality parameter being indicative of whether the decompressed test digital image having been compressed using the compression parameter is suitable to render an acceptable outcome by the server-based OCR processing.

18. The system of claim 13, wherein to analyze the OCR quality parameter, the processor is configured to:

execute a first compressing the digital image using the compression algorithm to create a first test compressed digital image, the compression algorithm using a first compression parameter;

de-compress the first test compressed digital image to create a first test decompressed digital image;

execute a second compressing the digital image using the compression algorithm to create a second test compressed digital image, the compression algorithm using a second compression parameter;

de-compress the second compressed digital image to create a second test decompressed digital image;

apply the classifier to the first decompressed test digital image to determine a first OCR quality parameter and to the second decompressed digital image to determine a second OCR quality parameter;

select one of the first compression parameter and the second compression parameter based on an associated one of the first OCR quality parameter and the second OCR quality parameter being indicative of a higher suitability of the respective one of the first decompressed test digital image and the second decompressed test digital image for rendering an acceptable outcome by the server-based OCR processing; and wherein the compressing the digital image using the compression algorithm to create the compressed digital image is executed by using the selected one of the first compression parameter and the second compression parameter.

19. The system of claim 13, wherein the compression algorithm is implemented as a codec selected from at least one of: JPEG and JPEG 2000.

20. The system of claim 19, wherein to analyze the OCR quality parameter associated with the test digital image, the processor is configured to consider compression data obtained from the codec.

21. The system of claim 13, wherein the classifier is implemented as a machine learning algorithm.

22. The system of claim 21, wherein the processor is further configured to execute training the machine learning algorithm.

23. The system of claim 13, wherein to analyze the OCR quality parameter, the processor is configured to:
define four contour images;
split each of the four contour images into non-overlapping blocks;
determine, for each of the fourth contour images, an average contrast; generate binary version of the image in order to define contour pixels; determine sharp pixels of each of the blocks; determine the number of contour pixels for each of the blocks; determine text blocks;
determine the OCR quality parameter based on the text blocks.

24. The system of claim 23, the processor being further configured to select those text blocks with the smallest font and wherein the determining the OCR quality parameter is executed on the selected text blocks with the smallest font.

25. Non-transitory computer-readable media for analyzing a digital image of a document, the non-transitory computer-readable media having recorded thereon instructions that when executed by one or more computer processors, perform operations comprising:
acquiring, by a user electronic device, the digital image of the document;
analyzing, by a classifier executed by the user electronic device, an OCR quality parameter associated with a test digital image, the test digital image created by compressing and decompressing the digital image using a compression algorithm and a compression parameter; and
in response to the OCR quality parameter being above or equal to a pre-determined threshold:
transmitting a compressed digital image to a server for the server to execute the server-based OCR processing, the compressed digital image created from the digital image using the compression algorithm and the compression parameter.

26. A method of analyzing a digital image of a document, the method executable by a user electronic device, the method comprising:
acquiring, by the user electronic device, the digital image of the document;
executing a classifier executed by the user electronic device, the classifier having been trained to predict an OCR quality parameter associated with the digital image based on primary characteristics associated with the digital image without having to compress the digital image; and
in response to the OCR quality parameter being above or equal to a pre-determined threshold:
transmitting a compressed digital image to a server for the server to execute the server-based OCR processing, the compressed digital image created using a compression algorithm and a compression parameter.

27. The method of claim 26, wherein the primary characteristics include at least one of: a font size, number of characters, number of characters per page, brightness of the image, or contrast level of the image.

28. The method of claim 26, wherein the classifier is implemented as a machine learning algorithm.

29. The method of claim 28, further comprising training the machine learning algorithm.

* * * * *